United States Patent [19]

Petersen et al.

[11] 4,263,809
[45] Apr. 28, 1981

[54] TETRAXIAL VEHICLE TEST FIXTURE

[75] Inventors: Niel R. Petersen, Hopkins; John E. Hart, Minneapolis, both of Minn.

[73] Assignee: MTS Systems Corporation, Eden Prairie, Minn.

[21] Appl. No.: 53,940

[22] Filed: Jul. 2, 1979

[51] Int. Cl.³ .................... G01M 17/00; G01N 3/32
[52] U.S. Cl. ........................ 73/798; 73/118; 73/669
[58] Field of Search ............ 73/669, 796–798, 73/118

[56] References Cited

U.S. PATENT DOCUMENTS

| | | | |
|---|---|---|---|
| 3,696,663 | 10/1972 | Klinger | 73/798 |
| 3,713,330 | 1/1973 | Lentz | 73/798 |
| 3,718,033 | 2/1973 | Petersen | 73/798 |
| 3,821,893 | 7/1974 | Klinger et al. | 73/118 |

OTHER PUBLICATIONS

J. D. Camp, "Random Load Fatigue Test on Automotive Components & Structures"-ASTM-STP-476, pp. 46-58, Jun. 1969.

*Primary Examiner*—James J. Gill
*Attorney, Agent, or Firm*—Kinney, Lange, Braddock, Westman & Fairbairn

[57] ABSTRACT

A test system for testing axles and wheel spindles directly in place on vehicles such as automobiles, which simplifies the loading to obtain the necessary information for testing axles and spindles using two sets of actuators, each set comprising a pair of actuators each operating to control loads on the spindle along two different orthogonal components of normal movement of the vehicle. The actuator arrangement saves space, permits testing without removing automotive sheet metal and simplifies the compensation factors necessary for controlling such systems.

14 Claims, 8 Drawing Figures

FIG. I

TETRAXIAL VEHICLE TEST FIXTURE

BACKGROUND OF THE INVENTION

1. Field of the Invention

The present invention relates to systems for testing spindles and axles of automotive vehicles.

2. Prior Art

In the prior art it has been known that the loading on automotive spindles and axles can be simulated by mechanical testing systems. For example, a triaxial loading fixture which utilizes bell cranks for compact loading arrangements is shown in U.S. Pat. No. 3,713,330. This system works well where sheet metal can be removed for testing the particular spindle or axle being utilized, but in particular when the type of system is used with "swing" arm axles, wherein upward movement of the axle or spindle relative to the vehicle causes the axis of the axle to move in fore and aft direction as well, the necessary compensations are quite complex, and while they can be carried out and accommodated, these movements give rise to programming and control problems.

A prior axle test unit, which was cited in U.S. Pat. No. 3,713,330, is described in the article by J. D. Camp, "Random Load Fatigue Tests On Automotive Components And Structures"—ASTM-STP-476, Pages 46–58, published June 1969. This article disclosed a direct loading device for loading in three separate loading directions on automotive spindles.

Other complex linkages have been utilized for loading spindles, including four bar linkages, and further independent cylinders have been used for providing brake load inputs, lateral inputs, longitudinal load inputs, and vertical inputs. However, the device of the present invention simplifies the mounting and control for the loading of axle spindles and includes means to apply brake forces.

SUMMARY OF THE INVENTION

The present invention relates to a fixture or test system for testing axles and wheel spindles directly on vehicles, which utilizes at least a first pair of actuators that have axes intersecting at a point to load the spindle in shear loads in longitudinal and vertical directions to each provide components of force in two orthogonal reference directions, other than along the axes of the actuators. To complete loading in all normal loading directions on a vehicle wheel a second pair of actuators also having axes which intersect may be used for simulating the tire patch loads in lateral and longitudinal directions. Four axes of loading are accommodated. The individual actuators of each pair operate through bell cranks to minimize mass, and to minimize cross coupling effects that have to be compensated for.

The loading actuators can be mounted for operation with vehicles that have swing axles, where the axle or spindle itself will move about an arc as it moves vertically. One set of the actuators in the present invention can be inclined to minimize the cross coupling that arises in loading on the tire patch component loads during such swing movement.

DESCRIPTION OF THE PREFERRED EMBODIMENT

Figure 1:
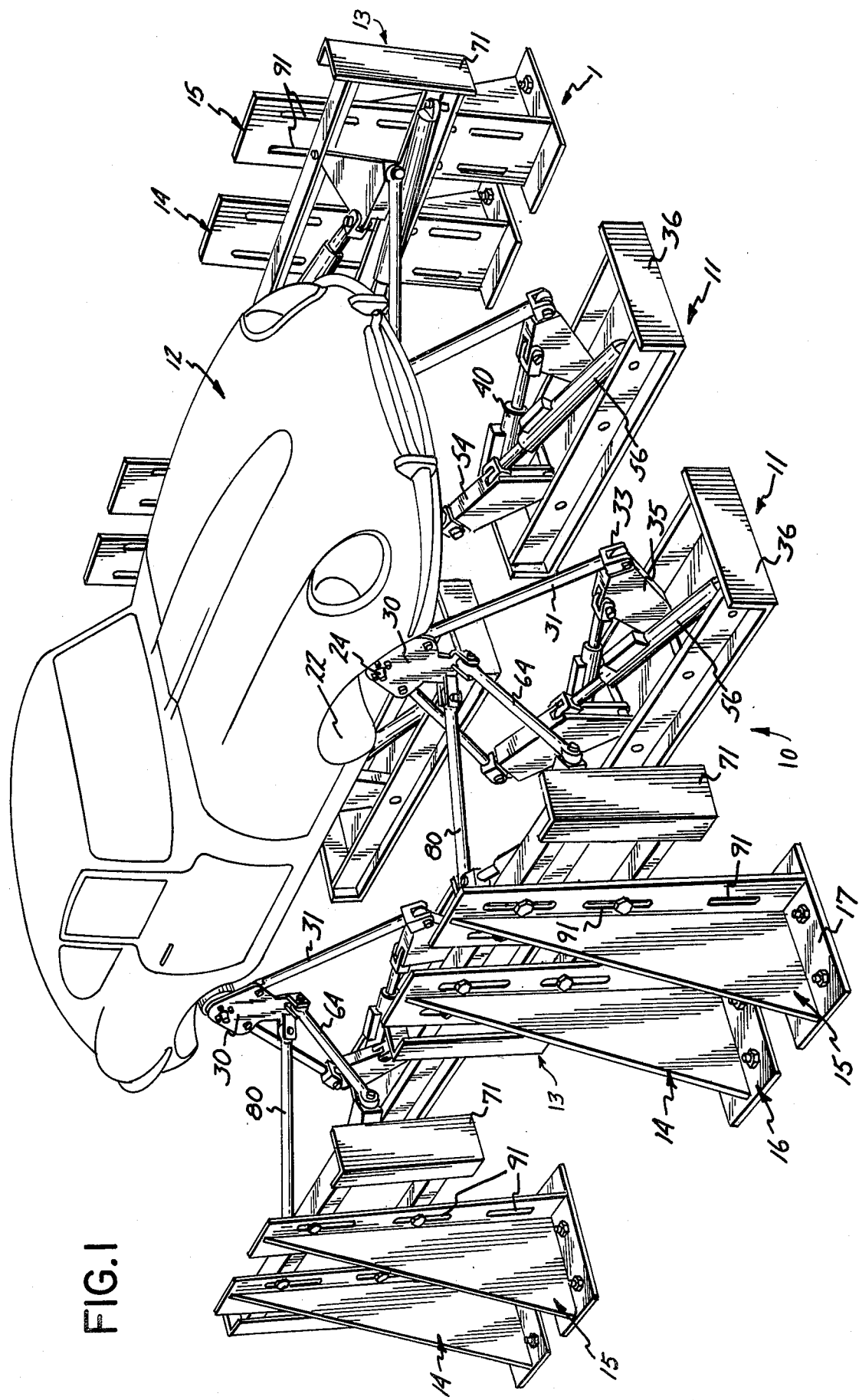
FIG. 1 is a perspective view of a typical installation of the device of the present invention on an automobile.

The tetraxial test system illustrated generally at 10 includes first actuator assemblies indicated generally at 11 at each of the corners of a vehicle 12. The actuator assemblies 11 include a pair of actuators which are used for loading the respective wheel spindle in shear in both longitudinal and vertical directions. Assemblies 11 are mounted on the floor below the vehicle 12. The vehicle 12 may be mounted in position for testing without removing any of the sheet metal because the device of the present invention provides adequate clearance, as will be explained. The test system includes a lateral input actuator assembly 13 at each of the spindles, or corners of the vehicle. The assemblies 13 provide for the simulation of lateral and braking loads, also called tire patch loads.

Each of the assemblies 11 and 13 are substantially identical in construction, but the assembly 13 is adjustably mounted on upright support columns 14 and 15, which in turn have base portions 16 and 17 that are bolted to the floor.

Figure 2:
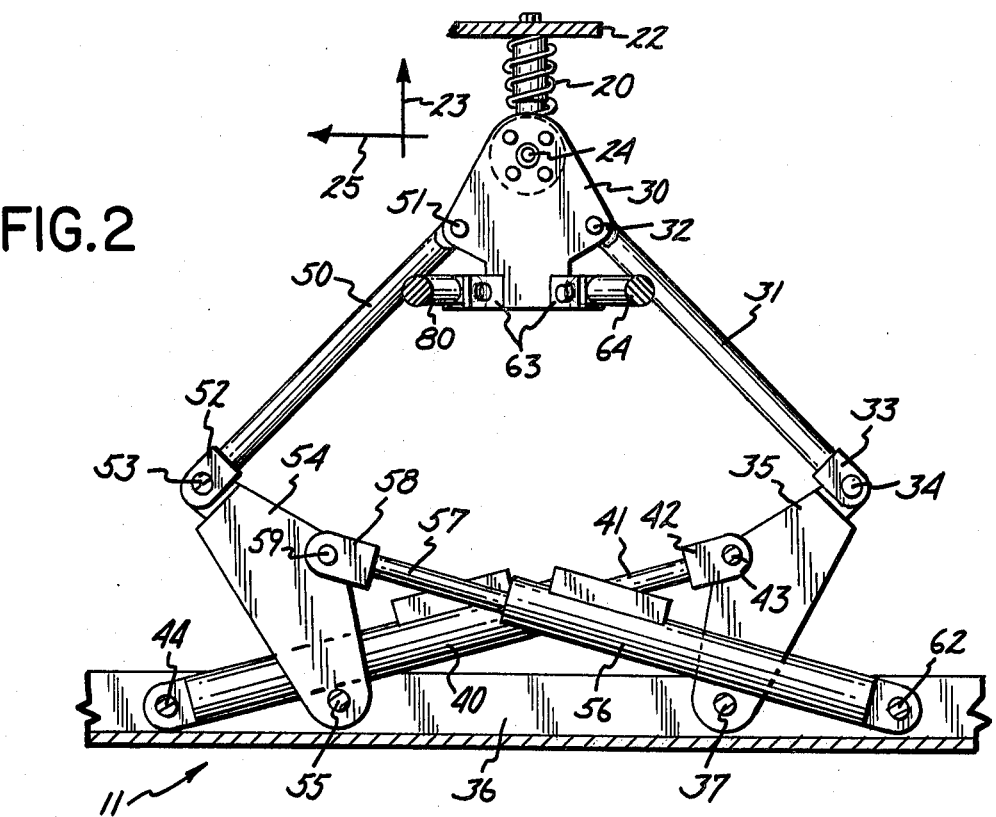
FIG. 2 is a side view of the actuators which are mounted directly below the spindle and which provide vertical and longitudinal shear forces on the spindle.

The vehicle has a suspension system indicated partially at 20, including a support spring 21 that is mounted to the frame 22 of the vehicle. It can be seen that in the vertical direction, as indicated by the arrow 23, the amount of movement of the spindle shown at 24 (which is the front wheel spindle as shown), is quite large. Both the rear axle and the front spindle have substantial vertical movement during operation of a vehicle. Thus there must be a substantial amount of vertical movement in testing any spindle, as well as an application of load in the horizontal direction, longitudinally of the vehicle or automobile, as indicated by the arrow 25 (FIG. 2).

The actuator assembly 11 is to provide the movement and load in the vertical and longitudinal directions of the spindle or axle tested as indicated by arrows 23 and 25. These are shear forces acting directly on the spindle. A mounting bracket 30 is provided and as shown is mounted with the wheel mounting bolts directly onto the wheel hub, which is rotatably mounted on the spindle 24. In certain instances the adapter or mounting bracket 30 can be mounted to the brake backing plate to load the spindle. The mounting bracket 30 is thus rotatably attached to the spindle or axle and includes a pin 32 on which one end of a first compression loading link 31 is pivotally mounted. The loading link has a rod end mounted on pin 32 which includes a spherical seat that provides for a limited amount of universal twisting, pivoting movement of the link 31 and rotation of the link 31 about the axis of the pin 32.

The opposite end of the link 31 has a yoke 33 fixed thereto which is pivotally mounted with a pin 34 to a bell crank assembly 35.

The loading assemblies 11 each include a base frame 36 that has a pair of spaced apart longitudinally extending side wall members, and the bell crank 35 is pivotally mounted on a pin 37 extending between the side members of the frame 36. As can be seen the bell crank 35 is controlled for pivotal movement about the axis of the pin or shaft 37 through a servo controlled hydraulic cylinder or actuator illustrated generally at 40. The hydraulic cylinder assembly 40 has a servovalve mounted on it, and has a rod 41 which has a rod end 42 connected as at 43 to the bell crank 35 at a desired location with respect to the pins 37 and 34. The base end of the hydraulic cylinder assembly 40 is mounted with a pin as at 44 at a position spaced from the pin 37, and adjacent to one end of the frame assembly 36.

It can be seen that the longitudinal axis of the link 31 forms an angle of about 45° from the vertical when it is in position, and as the cylinder 40 has its rod 41 extended or retracted, the bell crank 35 will pivot on shaft 37 and will load the link 31 either in compression or in tension depending on the desired direction of movement of the spindle 24.

A second link 50 is used for loading bracket 30 and is pivotally mounted on a pin 51 to the mounting bracket 30. A spherical seat rod end is used for the mounting between the link 50 and pin 51 so that the link can twist as well as pivot about the pin 51. The opposite end of link 50 has a yoke 52 thereon which is pivotally mounted with a pin 53 to a portion of a second bell crank 54. The second bell crank 54 is mounted with a shaft 55 or pivot pin to the frame 36 at a point on the frame 36 spaced from the pin 37, and as shown adjacent the end of the frame where pin 44 mounts the base of cylinder 40. A cylinder or actuator 56 which actuates the bell crank 54 extends from the bell crank 54 to frame 36 and is pivoted to the frame 36 with a pin 62 adjacent an opposite end of the frame 36 from pin 44. It can be seen that the cylinders 40 and 56 crisscross to save space.

The cylinder 56 has a rod 57, which has a yoke 58 at the outer end thereof mounted with a pin 59 to the bell crank 54. The pins 34 and 52 pass through ears on the bell cranks and the ears are arranged so the bell cranks may be offset to provide room for the cylinders 40 and 54 to pass alongside the bell crank other than the one controlled by the respective cylinder.

It can thus be seen that actuation of the cylinders 56 and 40 simultaneously by retracting the rods, as shown in FIG. 2, will cause a vertical movement of the spindle 24. Because of the angle of loading, the links 31 and 50 (link 50 is about forty five degrees from vertical as well) will also apply a component of force in fore and aft, horizontal direction, which force will be a function of the difference in the loads applied by the two cylinders 40 and 56. The vertical movement or force will be a function of the sum of the movements of the two cylinders 40 and 56.

The lower portion of bracket 30, as shown, is provided with a pair of receptacles for receiving the lateral or tire patch loading links. Each of the receptacles comprise a pair of ears 63 which are positioned at an angle with respect to the plane of the mounting bracket 30.

Figure 3:
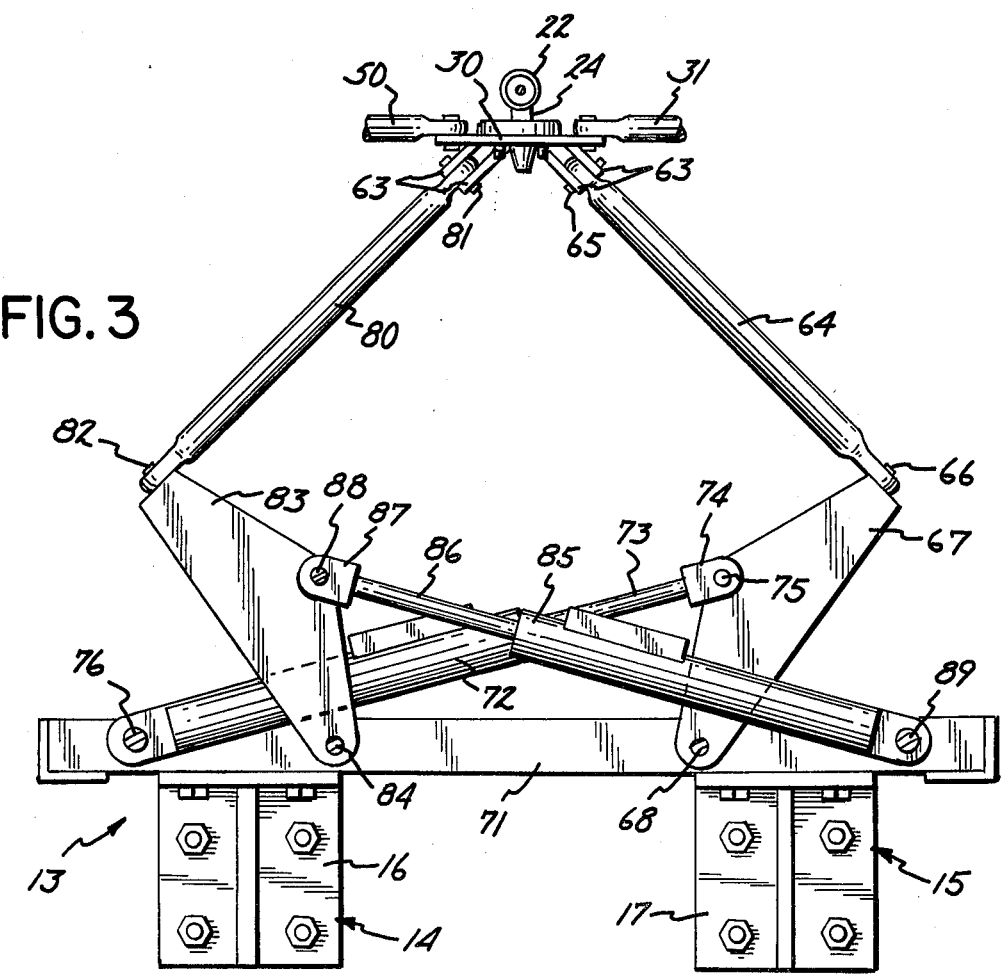
FIG. 3 is a sectional view showing the horizontal or lateral loading actuator assemblies as viewed from the top along a plane below the spindle shown in FIG. 1.

To provide for the tire patch loading, both lateral (transverse to the length of the vehicle) and longitudinal brake loading, the assembly 13 is utilized, and as can be seen in FIG. 3 (top view), the assembly 13 is substantially similar to that shown in FIG. 2, except that it is positioned generally horizontally. A first link 64 has a universal rod end connection at one end which is mounted with a pin 65 between the ears 63 at the front edge of the mounting bracket 30. The link 64 in turn extends at an angle (about forty five degrees) with respect to the axis of the spindle, and lies as shown in a substantially horizontal plane. The outer end of link 64 has a rod end connection mounted on a pin 66 that is fixed to and protrudes from one end of a bell crank 67. The bell crank 67 is pivotally mounted with a shaft or pin 68 to a frame 71 forming a portion of the assembly 13. The frame 71 comprises a pair of side members, and end members forming a box-like structure and the pin 68 extends between the side members.

A first lateral loading servovalve controlled hydraulic cylinder or actuator 72 has an extendable and retractable rod 73 that has a yoke 74 at its outer end, which in turn is pivotally mounted with a pin 75 to a portion of the bell crank 67. The base end of the cylinder 72 is mounted with a pin 76 to the frame 71 adjacent a first end of the frame 71. The link 64 carries compression or tension loads to the mounting bracket 30 when actuated by the cylinder 72.

A second lateral loading link 80 has a spherical seat rod end which is mounted with a pin 81 between a second pair of the ears 63 adjacent an opposite side edge of the mounting bracket 30. The link 80 extends laterally outwardly from the mounting bracket 30 and is pivotally mounted through a rod end type connecton to a pin 82 that is fixed to and protrudes from a bell crank 83. The bell crank 83 is a second bell crank forming a portion of the loading assembly 13, and is pivotally mounted with a shaft or pin 84 to the frame 71. The bell crank 83 is controlled for pivotal movement about the axis of the pin or shaft 84 through the use of a servovalve controlled cylinder or actuator 85. The cylinder 85 has a rod 86 with a yoke at its end indicated at 87 mounted with a pin 88 to another portion of the bell crank 83. The base end of the cylinder 85 is pivotally mounted with a pin 89 to the frame 71 adjacent an opposite end of the frame from the pin 76 so that the cylinders 72 and 85 crisscross in the same manner that the cylinder 56 and 40 crisscross for compactness in mounting.

Figure 4:
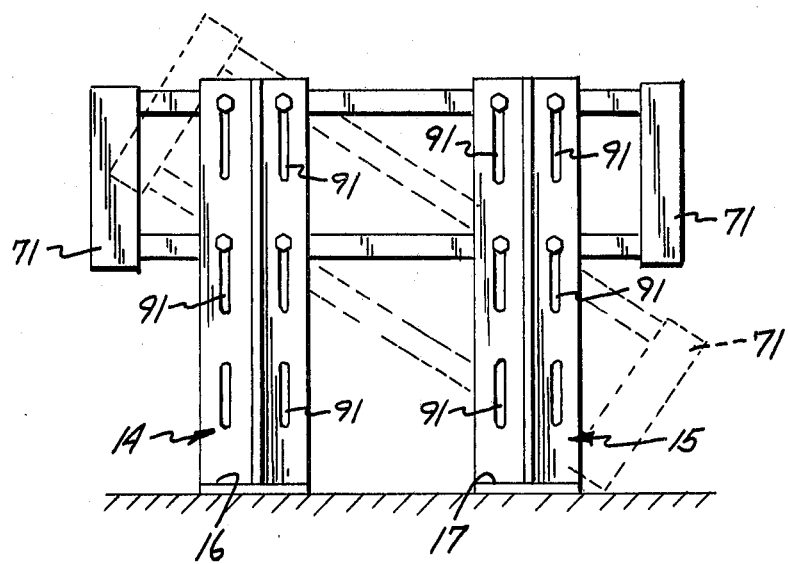
FIG. 4 is a part schematic vertical side view of the actuator assemblies shown in FIG. 3.
Figure 5:
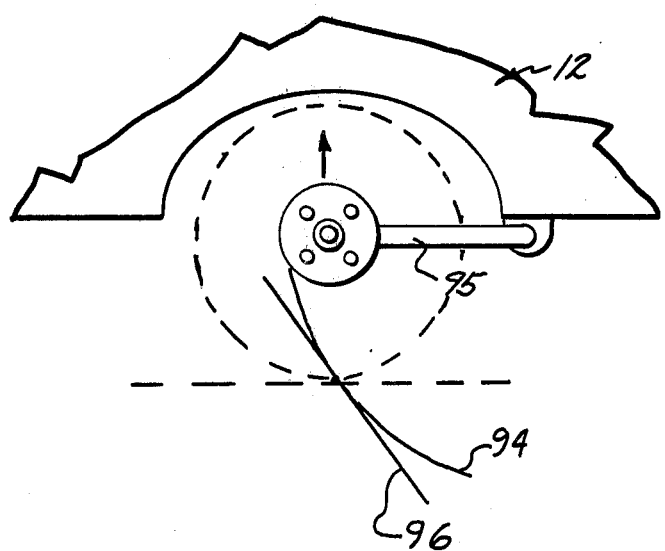
FIG. 5 is a schematic representation of the path of movement of a "swing axle", to show the plane of inclination of the tire patch actuator assembly.

The side members of the frame 71 have flanges which are bolted to the upright supports 16 and 17, respectively. The supports 16 and 17 have elongated slots indicated generally at 91 (FIGS. 1 and 4). These slots permit the entire frame 71, including the actuators and the links to be canted or inclined relative to the horizontal as shown schematically in FIG. 4. Inclination up to 30 degrees may be desirable to minimize the control disturbances due to vertical motion, which by its nature has very high velocity components compared to typical horizontal loading velocities, when a swing axle is tested. As shown in FIG. 5, schematically, a swing axle 95 moves along an arc 94 and by making the plane in which the tire patch loading orthogonal directions lie in a plane parallel to the axis of the axle and more-or-less lie parallel to the chord of the arc of swing, the loading is less affected by the vertical inputs. The axes of links 80 and 64 are parallel to and preferably lie in plane 96. The attachment for the links 64 and 80 to the fixture can be changed to accommodate the inclination or the fixture can be rotated. The tilting provides a linear approximation of tire patch motion of a swing axle to help compensate for the arcuate movement of the spindle or axle, and thus the tire patch, during vertical movement.

In analyzing the lateral loads that would be placed onto the spindle, a summation of the moments of the links 64 and 80 will be a function of the lateral input, or the load on the spindle in axial direction, and differential in movement between the links 64 and 80 will be a function of the braking input. It should be noted that when a wheel hub is utilized with the mounting bracket 30, the brakes of the vehicle have to be applied to provide for braking load. However, the brake load can be simulated if the bracket 30 is mounted directly to the brake backing plate.

Figure 6:
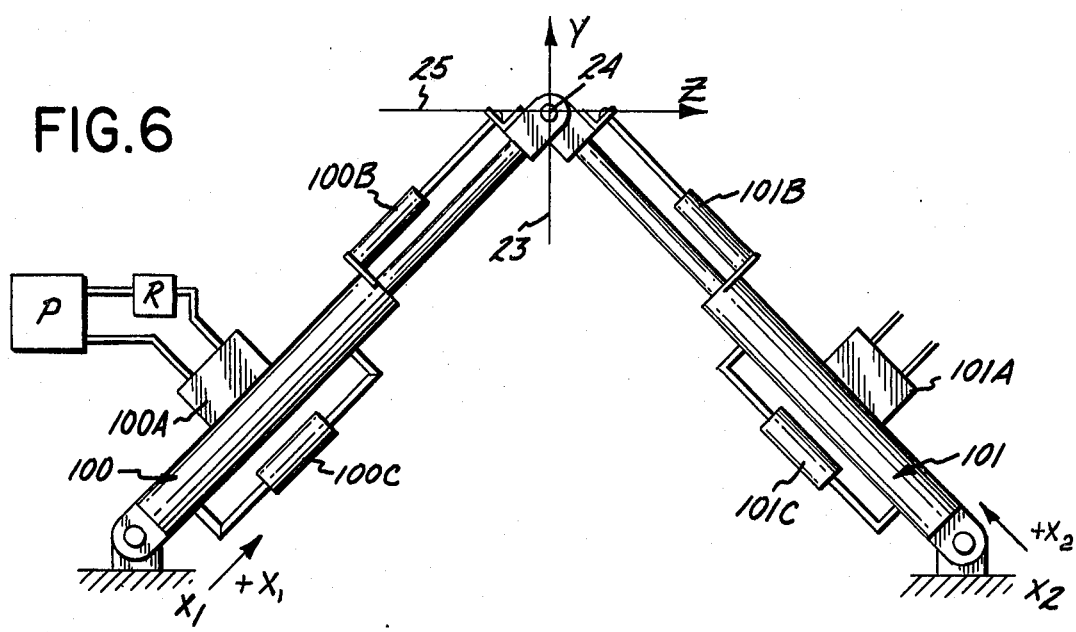
FIG. 6 is a schematic representation of the loading actuators for the vertical and fore and aft directions.

Referring to FIG. 6, a schematic representation of two of the hydraulic loading cylinders or actuators is represented. For simplicity, the cylinders are shown as loading directly in toward the spindle 24 which is represented at the intersection of the axes of the cylinders. FIG. 6 is for aiding in explanation of the load and control configuration.

As shown the spindle 24 is loaded by lines of force from the cylinders intersecting at the spindle axis. The force generators are shown as cylinders indicated generally schematically at 100 and 101, respectively. In the preferred embodiment, bell crank loading is used, but for explanation direct loading devices are illustrated. The cylinders are controlled through servovalves 100A and 101A in a normal manner. Additionally, there would be stroke transducers 100B and 101B, respectively, and also load sensors or transducers, comprising suitable differential pressure sensors, for example, indicated at 100C and 101C. The stroke transducers may be coupled directly to the bell cranks if desired. The loading in direction of arrow 23 is considered the "Y" direction and the loading in direction of arrow 25 is considered the "Z" direction, as indicated in FIG. 6.

Normally, the feedback from any of the loading cylinders can be either stroke or load, but it has been found in testing that it is highly desirable that in the vertical direction (Y) stroke control be the control parameter because of the distance that is traveled by the spindle in order to accommodate the necessary movement to simulate road use.

Figure 7:
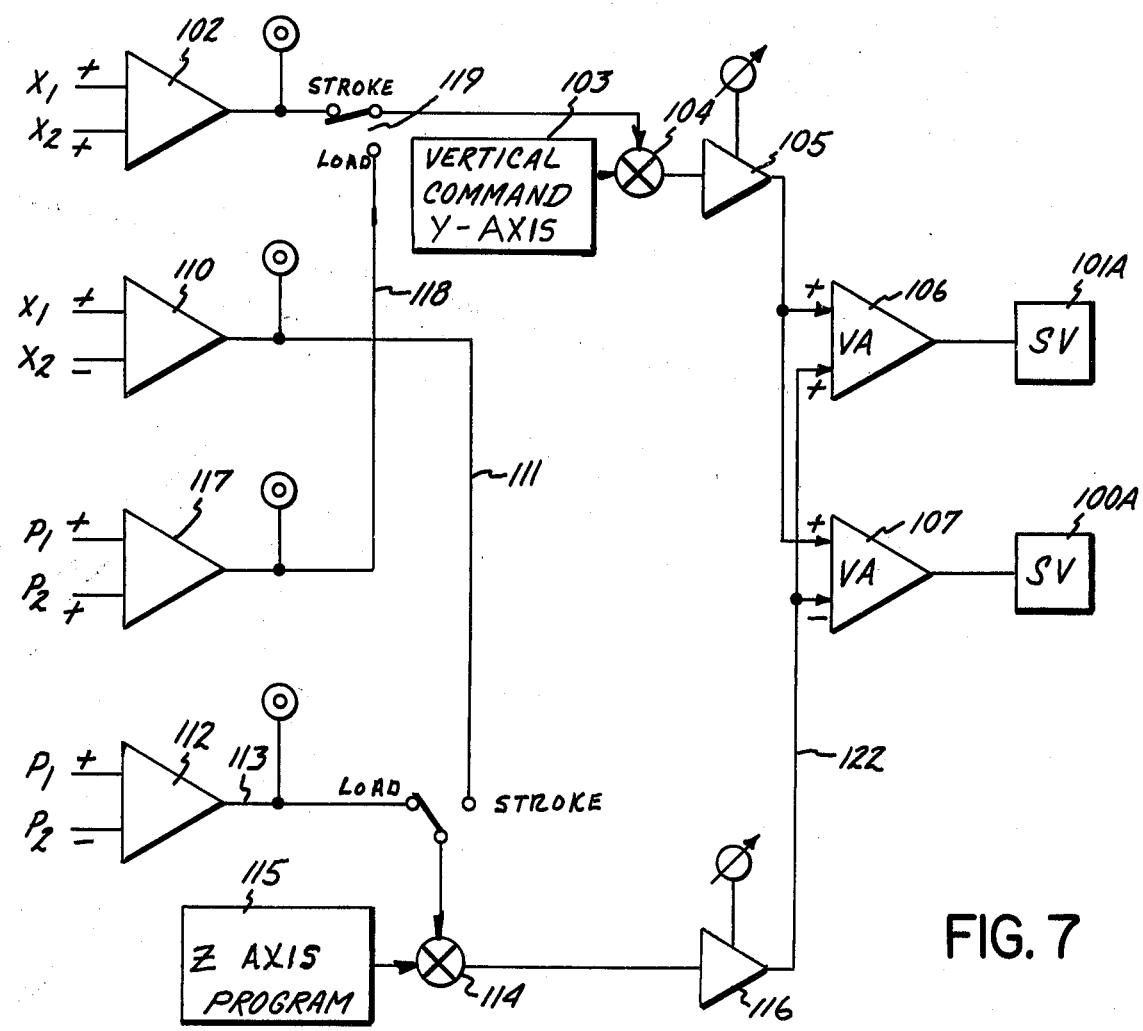
FIG. 7 is a schematic representation of a simplified control circuitry utilized with the device of the present invention.

Stroke control inputs are indicated by $X_1$ and $X_2$ in FIG. 6. The $X_1$ representing the stroke signal from transducer 100B, and $X_2$ representing the signal from transducer 101B. A schematic control arrangement (greatly simplified) is shown in FIG. 7. The signals $X_1$ and $X_2$ are fed into a vertical stroke summing amplifier 102 which provides an output equal to 0.707 of the sum of the inputs. This output is proportional to the vertical motion of the spindle. This is when the forces are applied along 45° lines relative to the Y direction. Note in the preferred embodiment the links carry these forces. The "vertical" or "Y" command program is provided by a vertical program source or programmer 103, and can comprise a tape or other input signal that provides the desired program signal for the vertical displacement along the Y axis of the spindle.

The output signal from the vertical programmer 103 is summed at a summing junction 104 with the output from the vertical stroke summer 102, after suitable gain controls have been added, and this error signal then is amplified by a suitable servo amplifier 105. The output signal from 105 is then fed to a first input of a valve amplifier 106 that is used providing a proper signal level for the servovalve 101A. The second input of valve amplifier 106 is coupled to provide either "load control" or stroke control in the horizontal or "Z" direction. In horizontal stroke control, the input $X_1$ and $X_2$ are provided through the plus and minus inputs of an amplifier 110, which gives a signal along a line 111 equal to the differences in stroke. In the preferred embodiment, the signal even if derived from the actuators transducers 100 and 101 will relate to the horizontal movement of the spindle 24. The force transducer can similarly have outputs weighted to take into account the geometry. The signal on line 111 thus is a function of the amount of movement in "Z" direction, if it is desired to control the servovalves in stroke control in regard to the Z axis.

However, as a frequent alternate, the Z axis spindle motion would be load controlled rather than by displacement or stroke. This is provided with the signals $P_1$ and $P_2$, which are the load signals from the load transducers 100C and 101C, respectively. The $P_1$ signal is provided to a "plus" input of an amplifier 112, while the $P_2$ signal is put into the "minus" input of that amplifier. The signal along the output line 113 of amplifier 112 is then a function of the difference in load between the two actuators or the actuated links and is thus related to the horizontal load. The line 113 load feedback signal is summed at a summing junction 114 with a signal from the "load" command program for the Z direction from a suitable command program source 115. The error signal from summing junction 114 is then amplified by an amplifier 116 and which has an output line 122 connected to a "plus" input of valve amplifier 106, and also connected to a minus input of a valve amplifier 107 which is used for controlling the servovalve 101A. Note also that the output of amplifier 105 is connected to the plus input of amplifier 107 and a plus input of amplifier 106 so that the signal from amplifiers 107 and 106 are referenced to both Y and Z directions.

The load feedback signals $P_1$ and $P_2$ can be applied to plus inputs of an amplifier 117, to provide an output feedback signal along a line 118 representing the sum of the load signals. If load control is desired for the "Y" direction, line 118 can be connected into the summing junction 104 through a suitable switch 119. The switch 119 will disconnect amplifier 102 when line 118 is connected to summing junction 104.

Likewise, the signal along line 111, which represents the difference in the strokes of the cylinders or loading devices 100 and 101, can be switched to summing junction 114 to provide a feedback signal based on "stroke" for providing the Z direction actuation. Thus one can have stroke/load control, stroke/stroke control, and load/load control for the loading of an axle or spindle in two orthogonal directions. Use of two loading devices with the links at 45° to the direction of load saves space while providing accuracy. Certain assumptions can be made as to the relative movement of the cylinders. While the relationship is not exactly linear, in the normal range of operation, the linear approximation is sufficient. If necessary, compensation for the fact that the vertical movement will be greater or less for each increment of movement of the cylinders depending on the stroke or position of the cylinders can be compensated for in the control devices.

The same control set up can be used for loading in the lateral and brake input directions at the tire patch. Usually load/load control is used for those inputs. Further, reference is made to U.S. Pat. No. 3,800,588 to show a control system for controlling actuators in multiple axes on a table. Similar but less complicated techniques are used with the present apparatus.

Figure 8:
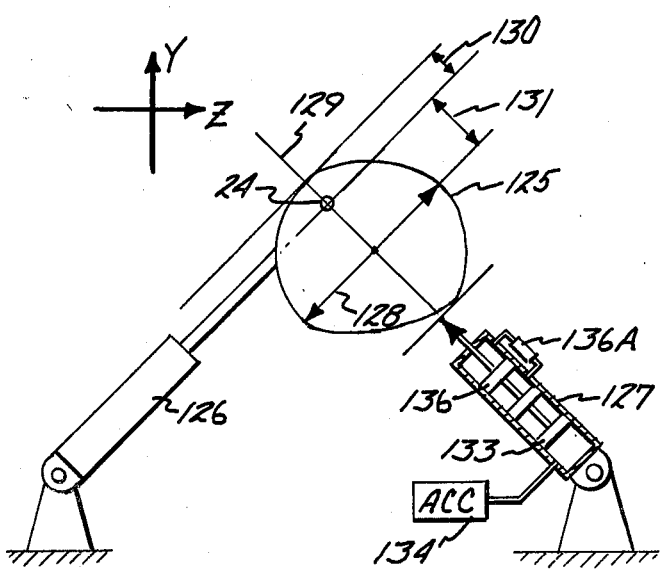
FIG. 8 is a representation of a typical matrix of the forces on a front wheel spindle and illustrating the positioning of the actuators to provide for efficiency in operation.

An additional feature of the orientation of the actuators and links so that the links load the spindle at approximately 45° angles with respect to the orthogonal directions is that the movement of the actuators is made more efficient because of the orientation of the load. Matrix analysis of the force vectors on a spindle or axle illustrates this. Reference is made to FIG. 8 for a brief and schematic showing of such an analysis. Assuming that the spindle 24 is an automotive front wheel spindle as shown, it can be quite clearly understood that the load carried by the spindle in use varies in amount in relation to the direction of such load. In other words, there is very little down load at any time on a spindle, and really the only down loads are inertia of the wheel when the spindle assembly may hit the rebound bumper on the automobile. Forward loads may come from backing over a curb, but generally these are not very significant nor high. Substantial and significant vehicle spindle loads can be encountered longitudinally, rearwardly, however, and also vertically upwards. Thus, one can take the vectors of loads around the spindle and come up with a matrix envelope representing the reasonably anticipatable range of force vectors that is shaped somewhat as shown at 125 in FIG. 8.

When actuators or links load the spindle 24 in the two orthogonal directions (the Y and Z directions as shown in FIG. 8) directly, the neutral point of the forces in both the fore and aft direction (Z direction) and the vertical direction (Y direction) is substantially offset from the axle center line or axis. When loading in these orthogonal directions, therefore, if the line of force is along the orthogonal direction, there has to be a substantial amount of differential in peak load capability in the two directions of loading movement along that orthogonal line. This is particularly true in the fore and aft direction. However, the loading devices have to be able to provide the necessary force vectors which fall within the envelope that is shown at 125 in FIG. 8 and in the orthogonal system it means that the actuator has to be capable of providing a great deal more up load than it does down load, for the vertical actuator, and the fore and aft actuator has to supply a great deal more aft load than it does forward load. With the actuators skewed 45°, as shown schematically in FIG. 8 for actuators 126 and 127, the actuator 126, pointing up and forwardly with respect to the vehicle has substantially balanced the force requirement as represented by the double arrow 128. This is the load or force on either side of a midline 129 that is perpendicular to the axis of the actuator 126 and passes through the axis of the spindle 24.

Therefore actuator 126 can be of size that provides the same amount of force on either side of the zero line 128 (that zero line is for actuator 126). There is still offset load requirements for the fore and aft direction, and the neutral point for the fore and aft actuator 127 is represented along the intersection of lines 129 and 128 in FIG. 8.

It can be seen therefore that this actuator 127 has to provide a substantial amount more up load than down load. Its loading efficiency can benefit by providing a static load on the actuator as part of the necessary up load and the cyclic load, or load requiring a dynamic amplitude, can be controlled through the servovalve. For example, the amount of dynamic load for actuator 127 is represented by the double arrow 130. This is the load that is represented to the rear and above the spindle 24.

By applying a static load in up and rear direction which is substantially equal to the amount of offset in the one direction, for example the amount which would be represented by the vector or a double arrow 131, the amount of cyclic load or dynamic load then can be reduced. To apply the static load, the actuator 127 is schematically shown as having a dual piston arrangement. A first static loading piston 133 is loaded through an accumulator 134 in an upward direction the desired amount to provide a force that would equal the force vector 131. The dynamic piston 136 is controlled by servovalve 136A for applying the dynamic load in opposite directions of the spindle 24 and equal to the vector 130.

Thus, in order to provide for optimum loading conditions and having an offset load or static load on only one of the actuators, the tilting of the two actuators out of the directions of the orthogonal axes of loading achieves desired results. This is done by the method of plotting the force vectors around the spindle axis to provide a matrix of force vectors, and then selecting the position of the two actuators to minimize the amount of offset load on at least one of the actuators in relation to the loading direction. This analysis saves money because the addition of the static loading sections to conventional actuators, (which can be provided in a wide variety of ways besides that which is shown schematically) raises the cost, and also the selection provides for utilization of actuator capability that increases the efficiency and reduces the oil and energy consumption of the overall system.

The concept of loading is to load a cantilevered work member in two orthogonal directions along lines which lie in a plane perpendicular to the axis of the work member, by having loading devices including links which load along straight lines that are generally parallel to the plane in which the loading direction lines lie, but which are along lines other than the desired orthogonal loading directions, to increase efficiency of the use of the actuators (by the matrix load analysis described in connection with FIG. 8) and also to permit the actuators to be placed out of the way of shielding components such as sheet metal. The tire patch loads are along orthogonal direction axes which define a plane perpendicular to the first plane and parallel but spaced from the spindle axis. The loading links load along axes which do not coincide with the orthogonal directions.

It should also be noted that the fixtures are made so that the links themselves in each of the loading assemblies do have axes which generally lie in a common plane corresponding to the plane defined by the orthogonal loading axes. One of the planes is perpendicular to the axis of the spindle and the other plane of loading, for tire patch loads is perpendicular to the first plane and parallel to the axis of the spindle, but offset from it.

What is claimed is:

1. A device for loading a work member which is cantilevered from a support and has an elongated axis under test loads in two orthogonal directions defining a first loading plane and wherein the work member as mounted has shielding components obstructing direct line loading in at least one of the orthogonal directions, comprising a first test fixture having a pair of links with loading axes positioned generally parallel to said first loading plane and at selected angles relative to each other and to the orthogonal directions, fixture means mounted to said member, said links being coupled to said fixture means, means to apply tension and compression loads selectively to each of said links at positions clearing said shielding components comprising a pair of bell crank members, and a pair of loading actuators mounted on the test fixture for controlling said bell crank members.

2. The device of claim 1 wherein said actuators are mounted on the test fixture so that they crisscross and one end of one actuator is adjacent the bell crank controlled by the other actuator.

3. The device of claim 1 including a second test fixture for loading the work member in second orthogonal axes lying in a second plane perpendicular to the first loading plane, said second test fixture comprising a second pair of links having axes parallel to the second plane and also being at desired angles relative to each other and to the second orthogonal axes, means coupling said second links to said fixture means at a location spaced from the axis of said member, and said second plane being offset from the axis of said work member a desired amount, and second means to selectively load said second pair of links in tension and compression including second bell crank members and second loading actuators controlling said second bell crank members.

4. The combination as specified in claim 3 wherein the second plane is generally parallel to the axis of said work member and wherein said second test fixtures includes mounting means for said second means to selectively load said second links, said mounting means comprising means to permit changing the mounting of said second means to selectively load to permit changing the angular orientation of said second plane around the axis of said work member so that said second plane is other than perpendicular to one of the first orthogonal directions.

5. The combination as specified in claim 1 wherein said work member comprises a shaft, and wherein said adapter is rotatably mounted on said work member, said pair of links of said first test fixture being oriented to load said work member in a plane generally perpendicular to the axis of said work member.

6. The combination as specified in claim 1 including means to control said pair of loading actuators at desired rates relative to each other to provide a loading input into said work member in a first orthogonal direction and to control a loading input of said actuator simultaneously in the second orthogonal direction.

7. The apparatus of claim 6 wherein said work member moves a substantial distance loading in the first orthogonal direction and wherein said means to control includes means to sense the amount of movement of said pair of loading actuators and to control the movement of the pair of loading actuators at a desired ratio between the two actuators forming the pair of loading actuators which is a function of the sum of movements of the individual actuators forming the pair of actuators.

8. The appartus of claim 3 or 7 wherein said pair of loading actuators load the work member to the desired level in the second orthogonal direction without substantial movement of the work member and wherein said means to control includes second means to sense the load on each of said actuators forming the pair of loading actuators and to control the loads exerted by each of said actuators at the desired ratio between the two which is a function of the difference in load exerted by the actuators forming the pair of loading actuators.

9. A device for loading an axle of a vehicle under test loads to simulate the loads encountered by the vehicle during use comprising a first test fixture having a pair of first links generally perpendicular to the axis of said axle, fixture means mounted to said axle, said first links being coupled to said fixture means and extending at other than perpendicular to a horizontal plane passing through the axis of the axle, means to apply tension and compression loads selectively to each of said first links, a second fixture having a pair of second links which lie in a first plane generally perpendicular to a plane perpendicular to the axis of said axle, means coupling said second links to said fixture means at a location spaced from the axis of the axle, and said second links each being other than parallel to said axis of the axle, and means to selectively load said second links of said second fixture in tension and compression.

10. The device as specified in claim 9 wherein said means to load said first and second links comprise bell crank members, separate hydraulic cylinders to pivotally move each of said bell crank members, first and second of said cylinders being mounted in said first fixture so that the first and second cylinders cross as they extend from mounting portions of the first fixture to their associated bell crank, and third and fourth cylinders mounted to said second fixture and also crossing as they extend from mounting portions of the second fixture to where they connect to their respective bell cranks.

11. The device of claim 9 wherein said second fixture includes mounting means, adjustable means on the mounting means to permit the second links to be simultaneously tilted relative to a horizontal plane.

12. A device for loading an axle of a vehicle under test loads to simulate loads encountered by the automobile during use in two orthogonal directions comprising a first test fixture having a pair of first elongated tension and compression carrying links having longitudinal axes generally perpendicular to the axis of said axle, fixture means mounted to said axle, said first links being coupled to said fixture means and the axes of both links extending at acute angles relative to the orthogonal directions, and means to apply tension and compression loads selectively to each of said first links including control means to control movements of the links to achieve the desired loading in the orthogonal directions.

13. The device of claim 12 including means to mount the links with the longitudinal axes thereof substantially parallel to a plane defined by said orthogonal directions.

14. A device for loading an axle of a vehicle under test loads to simulate loads encountered by the automobile during use in two orthogonal directions wherein the axle has substantial movement in one of the directions when loaded comprising a first test fixture having a pair of first tension and compression carrying links having loading axes lying in a plane at a known angular relationship to the axis of said axle, means to couple said first links to said axle with the axis of each of said links extending at an acute angle relative to the orthogonal directions, and means to apply tension and compression loads selectively to each of said first links including control means to sense and control the movements and loads on the links to achieve the desired loading and movements in the orthogonal directions.

* * * * *

UNITED STATES PATENT OFFICE
CERTIFICATE OF CORRECTION

Patent No. 4,263,809  Dated April 28, 1981

Inventor(s) Niel R. Petersen et al.

It is certified that error appears in the above-identified patent and that said Letters Patent are hereby corrected as shown below:

Column 9, line 44, (Claim 5, line 3) "adapter" should be --fixture means--.

Signed and Sealed this

First Day of September 1981

[SEAL]

Attest:

GERALD J. MOSSINGHOFF

Attesting Officer  Commissioner of Patents and Trademarks